United States Patent
Wayburn et al.

(10) Patent No.: US 9,637,182 B2
(45) Date of Patent: *May 2, 2017

(54) VEHICLE DRAG REDUCTION ASSEMBLY

(71) Applicant: AeroFab, LLC, Columbia, SC (US)

(72) Inventors: Lewis S. Wayburn, Irmo, SC (US); Stephen M. Tuel, Columbia, SC (US)

(73) Assignee: AeroFab, LLC, Columbia, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,183

(22) Filed: Oct. 6, 2014

(65) Prior Publication Data

US 2015/0035313 A1    Feb. 5, 2015

Related U.S. Application Data

(63) Continuation of application No. 13/625,007, filed on Sep. 24, 2012, now Pat. No. 8,851,554.

(60) Provisional application No. 61/691,291, filed on Aug. 21, 2012, provisional application No. 61/538,202, filed on Sep. 23, 2011.

(51) Int. Cl.
B62D 35/00 (2006.01)

(52) U.S. Cl.
CPC ......... B62D 35/001 (2013.01); B62D 35/004 (2013.01)

(58) Field of Classification Search
CPC ..... B62D 35/001; B62D 35/004; B62D 35/00
USPC .......................................... 296/180.4, 180.1
See application file for complete search history.

(56) References Cited

U.S. PATENT DOCUMENTS

| | | |
|---|---|---|
| 2,737,411 A | 3/1956 | Potter |
| 3,960,402 A | 6/1976 | Keck |
| 3,999,797 A | 12/1976 | Kirsch et al. |
| 4,006,932 A | 2/1977 | McDonald |
| 4,015,801 A | 4/1977 | Womble et al. |
| 4,257,641 A | 3/1981 | Keedy |
| 4,451,074 A | 5/1984 | Scanlon |

(Continued)

FOREIGN PATENT DOCUMENTS

| | | |
|---|---|---|
| DE | 3115742 A1 | 11/1982 |
| EP | 2206639 A1 | 7/2010 |
| WO | 2010053409 A1 | 5/2010 |

OTHER PUBLICATIONS

International Search Report and Written Opinion for Application No. PCT/US2012/056887, dated Dec. 12, 2012, all enclosed pages cited.

*Primary Examiner* — Joseph D Pape
*Assistant Examiner* — Dana Ivey
(74) *Attorney, Agent, or Firm* — Nelson Mullins Riley & Scarborough, LLP

(57) ABSTRACT

A drag reduction assembly is mountable on a vehicle or other object experiencing relative motion in a fluid environment. The assembly comprises at least one shell of flexible web material movable between non-deployed and deployed positions. In addition, the shell is configured to provide at least an outer flow surface in the deployed position (e.g., a curved surface) to reduce the effects of aerodynamic drag. In many embodiments, intake apertures such as NACA ducts may be provided to allow a portion of the flowing fluid into the shell. The flowing fluid will cause the shell to assume automatically the deployed position. In cases where fluid enters the shell, an exit location is provided in the shell to permit such fluid to exit and rejoin fluid on the outside.

21 Claims, 13 Drawing Sheets

(56) References Cited

U.S. PATENT DOCUMENTS

| | | |
|---|---|---|
| 4,458,936 A | 7/1984 | Mulholland |
| 4,508,380 A | 4/1985 | Sankrithi |
| 4,518,188 A | 5/1985 | Witten |
| 4,601,508 A | 7/1986 | Kerian |
| 4,682,808 A | 7/1987 | Bilanin |
| 4,688,422 A | 8/1987 | Wood |
| 4,705,238 A | 11/1987 | Gargano |
| 4,741,569 A | 5/1988 | Sutphen |
| 4,789,117 A | 12/1988 | Paterson et al. |
| 4,809,003 A | 2/1989 | Dominek et al. |
| 4,978,162 A * | 12/1990 | Labbe ............ B62D 35/004 296/180.2 |
| 5,058,945 A | 10/1991 | Elliott, Sr. et al. |
| 5,078,344 A | 1/1992 | Buckley |
| 5,236,347 A | 8/1993 | Andrus |
| 5,240,306 A | 8/1993 | Flemming |
| 5,280,990 A | 1/1994 | Rinard |
| 5,348,366 A | 9/1994 | Baker et al. |
| 5,375,903 A | 12/1994 | Lechner |
| 5,498,059 A | 3/1996 | Switlik |
| 5,513,893 A | 5/1996 | Nakata et al. |
| 5,823,610 A | 10/1998 | Ryan et al. |
| 6,092,861 A | 7/2000 | Whelan |
| 6,131,853 A | 10/2000 | Bauer et al. |
| 6,286,892 B1 | 9/2001 | Bauer et al. |
| 6,309,010 B1 | 10/2001 | Whitten |
| 6,409,252 B1 | 6/2002 | Andrus |
| 6,467,833 B1 | 10/2002 | Travers |
| 6,595,578 B1 | 7/2003 | Calsoyds et al. |
| 6,616,218 B2 | 9/2003 | Bauer et al. |
| 6,789,839 B1 | 9/2004 | Samuelson |
| 6,799,791 B2 | 10/2004 | Reiman et al. |
| 6,877,793 B2 | 4/2005 | Cory |
| 6,986,544 B2 | 1/2006 | Wood |
| 7,243,980 B2 | 7/2007 | Vala |
| 7,380,868 B2 | 6/2008 | Breidenbach |
| 7,740,303 B2 | 6/2010 | Wood |
| 7,740,304 B1 | 6/2010 | Breu |
| 7,854,468 B2 | 12/2010 | Vogel et al. |
| 7,866,734 B2 | 1/2011 | Mracek |
| 2002/0030384 A1 | 3/2002 | Basford |
| 2003/0205913 A1 | 11/2003 | Leonard |
| 2005/0040637 A1 | 2/2005 | Wood |
| 2005/0040669 A1 | 2/2005 | Wood |
| 2006/0273625 A1 | 12/2006 | Andrus et al. |
| 2007/0029837 A1 | 2/2007 | Vala |
| 2007/0089531 A1 | 4/2007 | Wood |
| 2007/0176465 A1 | 8/2007 | Wood |
| 2008/0303310 A1 | 12/2008 | Breidenbach |
| 2009/0026797 A1 | 1/2009 | Wood |
| 2009/0236872 A1 | 9/2009 | Wood |
| 2009/0256386 A1 | 10/2009 | Wood |
| 2010/0194142 A1 * | 8/2010 | Seifert ............ F15D 1/12 296/180.1 |
| 2011/0101730 A1 | 5/2011 | Tertnes |

* cited by examiner

VEHICLE DRAG REDUCTION ASSEMBLY

CROSS-REFERENCE TO RELATED APPLICATIONS

This application is a continuation of co-pending U.S. patent application Ser. No. 13/625,007, filed Sep. 24, 2012, which is based upon and claims priority to U.S. provisional application Ser. No. 61/538,202, filed Sep. 23, 2011, and U.S. provisional application Ser. No. 61/691,291, filed Aug. 21, 2012. All of the foregoing applications are incorporated fully herein by reference for all purposes.

BACKGROUND OF THE INVENTION

This invention relates to the reduction of aerodynamic drag on vehicles such as tractor-trailers, as well as other objects that experience relative motion with respect to surrounding fluid.

It is well-known that aerodynamic drag on vehicle bodies has a number of undesirable effects, including a reduction in fuel economy. These effects are particularly acute in the case of semi-trailers and intermodal containers, which have a box-like shape. In addition to environmental concerns, rising fuel prices contribute to increases in shipping costs that must be passed along to the public.

There have been efforts in the prior art to provide drag reducing devices for semi-trailers and other vehicles. For example, U.S. Pat. No. 2,737,411 discloses an inflatable streamlining apparatus for vehicle bodies. Some aerodynamic drag reduction devices are permanent and do not change configuration with changes in vehicle speed. These include side panels such as U.S. Pat. Nos. 4,451,074, 4,518, 188, and 7,740,303, and other airflow shaping devices such as U.S. Pat. Nos. 3,960,402, 3,999,797, 5,280,990, 6,986, 544.

Other aerodynamic drag reduction devices described in the prior art do change configuration. These devices can be divided into two basic categories: rigid and flexible. Rigid devices use plates and/or shaped panels that change configuration using hinges or other hardware, such as U.S. Pat. Nos. 4,257,641, 4,458,936, 4,508,380, 4,682,808, 5,348, 366, 6,092,861, and 7,854,468. Flexible devices described in the prior art are inflated, such as U.S. Pat. Nos. 4,006,932, 4,601,508, 4,741,569, 4,978,162, 5,236,347, 5,375,903, and 7,866,734.

Rigid structures can maintain their shape against air currents, but have the disadvantage of adding weight and complexity to the loading/unloading process (e.g., the panels must be swung to the side to open the trailer). Rigid structures are also easily bent or otherwise damaged (e.g., rigid side skirts are often deformed if the trailer is pulled across a mound such as railroad tracks). In addition, devices that create the greatest reduction in aerodynamic drag require complex surface curves, which are expensive to manufacture, so most such devices use less efficient flat surfaces.

Devices such as air-channeling vanes cause fewer problems with loading/unloading, but are also easily deformed, which causes a loss of effectiveness, and the overall reduction in aerodynamic drag is much less than is possible with devices that change the shape of the vehicle.

Flexible devices solve some problems inherent in rigid structures, and can be made more effective in reduction of aerodynamic drag, but present certain different problems. In particular, the prior art uses airtight bags and/or tubes that depend on a relative positive pressure compared to the environment to maintain the desired shape. Devices that utilize air scoops to inflate and create that positive pressure have difficulty maintaining shape unless the air scoops are large and located directly in the air stream, thus creating new aerodynamic drag. Other devices of the prior art utilize a positive pressure pumping system to inflate, but this adds complexity, requires driver input, and often delays opening the trailer.

U.S. Pat. No. 7,740,304 discloses a device that utilizes a flexible skin over hinged ribs similar in concept to an umbrella. In particular, the "flexible skin material" is attached to both the frame and the trailer body. A complex arrangement using levers, cables, pulleys, and a "scissor jack mechanism" is required to deploy and stow the device.

The present invention recognizes the foregoing considerations, and others, of the prior art.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present concepts of the invention in a simplified form as a prelude to the more detailed description that is presented later.

According to one aspect, the present invention provides a drag reduction assembly mountable on a vehicle comprising at least one shell of flexible web material. The shell is connectable to the vehicle so as to be movable between non-deployed and deployed positions. In addition, the shell is configured to provide an inner flow surface and an outer flow surface in the deployed position (e.g., a curved surface) along which air flows as the vehicle experiences relative motion with respect thereto. A drag reduction assembly according to this aspect further defines at least one intake aperture through which a portion of the moving air will enter and flow along the inner flow surface while other air flows along the outer flow surface. An air exit location is provided in the shell to permit the portion of the moving air which entered the shell to exit.

In some exemplary embodiments, the drag reduction assembly may further comprise first and second rigid mounting structures attachable to side surfaces of the vehicle. The shell in such embodiments is connected to the vehicle via the first and second mounting structures. It is contemplated, for example, that the mounting structures may each define a plurality of intake apertures. Intake apertures configured as NACA ducts are especially preferred in many embodiments.

It may be desirable in some cases to form the shell as an integral shell connected to both of the mounting structures. The integral shell may comprise both fluid impermeable material and fluid permeable material in different areas thereof. For example, the exit location of the shell may comprise fluid permeable material (such as a mesh). Alternatively, the shell may comprise first and second shells associated with respective sides of the vehicle.

Oftentimes, it may be desirable to equip the shell with a plurality of rigid or semirigid battens. At least some of the battens may be carried by respective horizontal buttresses attached to the inner flow surface of the shell. Such battens may advantageously experience compressive force when the shell is in the deployed position due at in part to aerodynamic forces imposed on the shell.

Embodiments are contemplated in which the shell comprises an outside layer and an inside layer. The outer flow surface in such embodiments will be an outside surface of the outside layer and the inner flow surface will be an inside surface of the outside layer.

According to another aspect, the present invention provides a drag reduction assembly for an object experiencing relative motion in a fluid environment. The assembly comprises at least one shell of flexible web material that is movable between a stowed, non-deployed position and a deployed position. In the deployed position, the shell defines a curved outer flow surface along which fluid will flow in a flow-smoothing manner. In addition, the shell is connectable to the object such that flow of fluid at least in part along the outer flow surface will cause the shell to deploy.

Embodiments are contemplated including first and second rigid mounting structures at which a leading edge of the shell is connected. In addition, the shell may comprise a plurality of support members that facilitate maintaining shape of the shell in the deployed position. It will often be preferable for the shell to comprise an unsupported web portion immediately distal of the leading edge that facilitates opening of the shell into the deployed position. For example, the support members may include elongate battens carried by the shell, which extend longitudinally between a first proximal location closer to but separated from the leading edge of the shell to a second distal location farther from the leading edge of the shell. At least some of the battens may be carried by respective horizontal buttresses.

According to this aspect, at least one intake aperture, through which a portion of the fluid will enter and flow along an inner flow surface of the shell, may be provided. For example, the mounting structure may define a plurality of such intake apertures (which may be configured, for example, as NACA ducts).

Another aspect of the present invention provides a combination comprising a vehicular object having first and second lateral sides and a rear surface downstream of the lateral sides. A drag reduction assembly is mounted to the vehicular object to smooth flow of air through which the vehicular object is moving. The drag reduction assembly comprises first and second drag reduction devices associated with respective lateral sides of the vehicular object.

Each of the drag reduction devices includes first and second flow modifiers, configured as vortex generators, located on respective lateral sides of the vehicular object. The drag reduction devices further include a flexible shell having a leading edge connected to the vehicular object such that the flexible shell is downstream of the flow modifiers. The flexible shell defines a curved outer flow surface extending from the leading edge, adjacent to a respective lateral side of the vehicular object, to a trailing edge spaced apart in a rearward direction from the rear surface of the vehicular object. It will often be desirable for the leading edge to be located upstream of the vehicular object's rear surface.

In some exemplary embodiments, the flow modifiers may be configured as first and second mounting structures to which the leading edge of a respective flexible shell is attached. For example, the flexible shell may be attached to the rigid mounting structure using a bead in slot arrangement. Regardless, the rigid mounting structures may each comprise a fixed portion attached to a respective lateral side of the vehicular object and a pivotal portion, with the leading edge of the flexible shell being attached to the pivotal portion.

Frequently, the vehicular object may comprise a semi-trailer having a pair of swing doors at the rear surface. In such cases, the first and second drag reduction devices may be further connected to respective swing doors.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
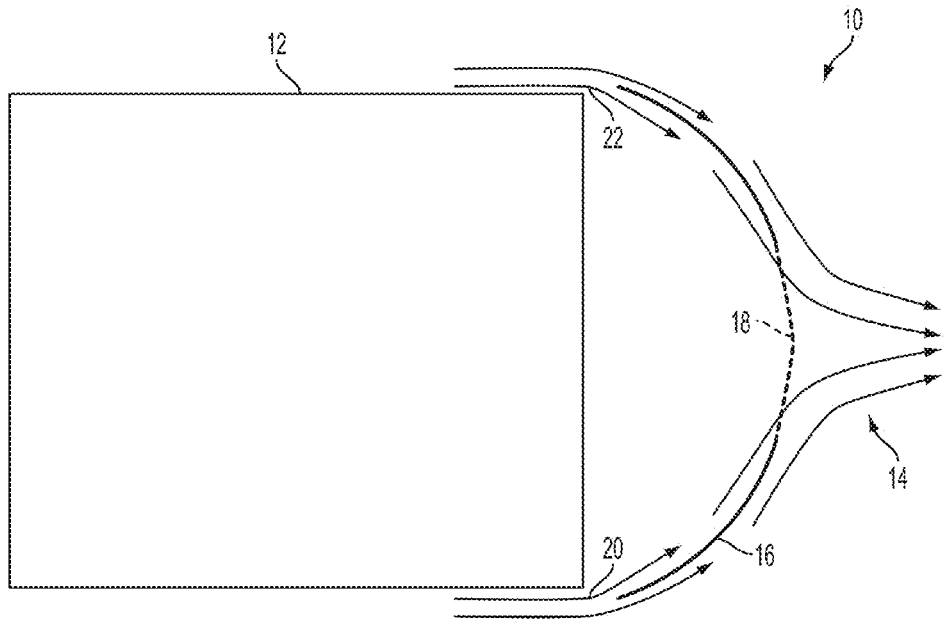
FIG. 1 is a diagrammatic representation viewed from above showing a drag reduction assembly attached to the rear end of a semi-trailer (or other object having relative motion to a surrounding fluid) in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

By way of additional background, those skilled in the art are aware that any solid object in relative motion to the surrounding fluid environment will experience forces applied by that fluid. The forces exerted by the fluid comprise viscous friction of the fluid in laminar flow combined with mass effects of turbulent flow. In most cases of severe aerodynamic drag, the primary adverse force is from the turbulent effects. Thus, altering the shape of an object to promote laminar flow, and retard or prevent the boundary separation to turbulent flow, will reduce the adverse forces, especially in a gaseous environment.

It is well known that adding a device to the boxy shape of a semi-trailer can smooth the airflow around the trailer, reduce drag, and thereby decrease the fuel required to pull the trailer on the highway. Many such devices have been proposed, most of which impair the standard function of the trailer (such as loading and unloading) or make compromises on the optimal aerodynamic shape to permit standard function.

In particular, a variety of devices, generically termed "boat-tails" or trailer end fairings, have been proposed to reduce the drag of the blunt rear end of the trailer. Few such devices have been produced in any volume, due to the seemingly inevitable tradeoff between aerodynamic efficiency and deleterious impact on operations. Exemplary drag reduction assemblies in accordance with this invention incorporate innovations that minimize the tradeoff between operational impact and aerodynamic efficiency, and simplify manufacturing.

As one skilled in the art will appreciate upon reading the following description, embodiments of the present invention are useful in reducing drag imposed on a variety of objects experiencing relative motion with respect to surrounding fluid. For example, embodiments of the present invention may be utilized with all sorts of vehicles including trucks and trailers (e.g., semi-trailers, intermodal containers, flatbeds, tanker trailers, box trucks, etc.), cargo vans, trains, and buses. The objects may have regular (e.g., rectangular) or irregular shapes.

Referring now to FIG. 1, a drag reduction assembly 10 in accordance with a first embodiment of the present invention is illustrated. As shown, assembly 10 is located at the rear end of a rectangular object 12, such as a semi-trailer. As indicated by flow arrows 14, air is flowing along the sides of rectangular object 12 from left to right.

Drag reduction assembly 10 generally comprises a flexible shell 16 formed from one or more pieces of suitable web material. For example, the primary fluid directing surface of drag reduction assembly 10 may comprise a single layer of fluid impermeable material similar to the type of fabric used to manufacture sails. As indicated at 18, permeable material may be provided in certain areas of shell 16. In addition, apertures may be defined or otherwise provided at selected locations in shell 16 to enhance the aerodynamic effects.

In this embodiment, apertures are provided at or near the leading edge of shell 16, as indicated at 20 and 22, to provide intakes for a portion of the moving air. As a result, some air will enter shell 16 and flow along the inside surface. Other air will flow along the outside surface of shell 16, as shown. Preferably, the flow surfaces of shell 16 will be curved inward from the lateral sides (and/or top, bottom or both) of object 12 toward the central axis of object 12.

The portion of air entering apertures 20 and 22 will exit through the permeable material 18 and rejoin the outside airflow, as shown. When the "inside" fluid exits and rejoins the "outside" fluid, it will augment the flow and inhibit separation of the flow along the outside flow surface. In other embodiments, it may be unnecessary to provide apertures 20 and 22 because airflow only on the outside will still tend to maintain the shape of shell 16 through aerodynamic effects. Either way, a relatively smooth flow results behind object 12, which reduces effects of drag as desired.

It will be appreciated that the apertures may be provided in the flexible material of shell 16, or in a rigid (or semi-rigid) mounting structure to which the flexible material is attached. For example, in some embodiments, the apertures may take the form of NACA ducts to effectively allow intake of flowing air without drag issues associated with a scoop-type inlet. The shape, size, and location of the intakes, as well as selected exhaust locations, can be varied in accordance with anticipated usage conditions (e.g., speed, environmental factors such as wind and ice) in order to control the volume and/or speed of airflow and to enhance aerodynamics. Moreover, the material (e.g., fabric) of the shell can be varied to adjust airflow and/or pressure across and/or through the surface.

It will also be appreciated that apertures 20 and 22 can be located on the lateral sides of object 12, rather than behind object 12 as shown. Such an embodiment could bring the front edge of shell 16 to, or even ahead of, the back edge of object 12. In some embodiments, for example, a drag reduction assembly of the present invention may attach to both the sides of the trailer and the rear doors, with a flexible material at the hinge point (such as fabric) where the device bends during door opening and closing. In contrast with the prior art, this arrangement accounts for differences in the door geometry of semi-trailers from one trailer to the next. In such an embodiment, both the trailer side component and the door component are active in aerodynamic drag reduction.

Figure 2:
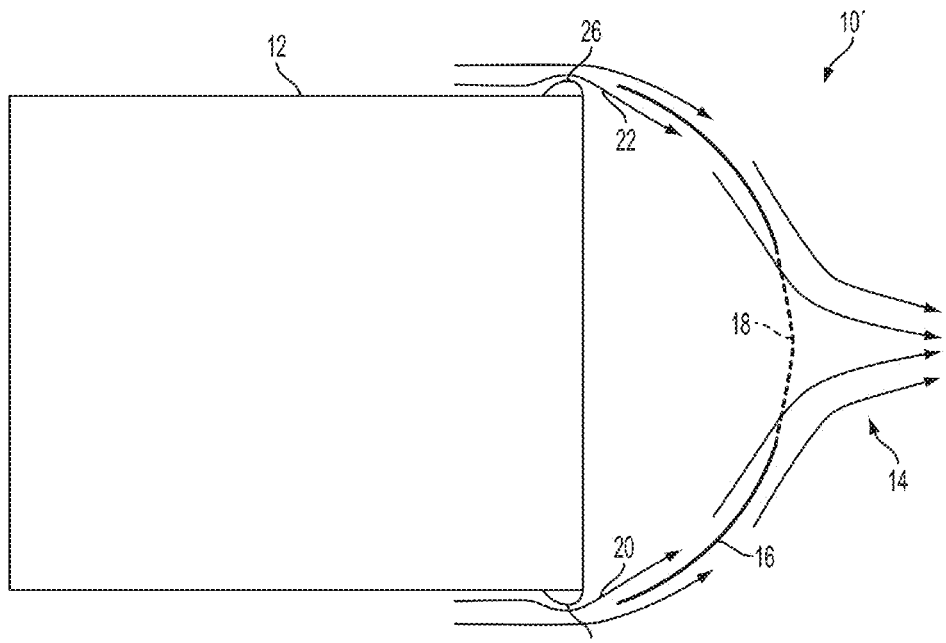
FIG. 2 is a diagrammatic representation similar to FIG. 1 showing a drag reduction assembly in accordance with an embodiment of the present invention.

FIG. 2 illustrates a drag reduction assembly 10' in accordance with an alternative embodiment of the present invention. As can be seen, assembly 10' is similar in many respects to the previous embodiment shown in FIG. 1. In this embodiment, however, each side of object 12 is equipped with a respective fluid flow modifier 24 and 26. Modifiers 24 and 26, configured in this case as small lateral bulges which the air flowing along the side of object 12 will encounter, are examples of a variety of structures that modify the airflow prior to the respective apertures 20 and 22 to adjust or guide the airflow into and around shell 16. Such structures delay separation of the airflow across the curve of shell 16 similar to vortex generators used on airplane wings.

However, in contrast to vortex generators on airplane wings, which are designed to increase the angle of attack and lower stall speed, vortex generators on drag reduction assembly 10' can be designed to permit a shorter radius in the curvature of shell 16. In particular, such vortex generators facilitate tighter radius/angle for flow redirection while inhibiting fluid flow separation from the shell surface. This can advantageously reduce drag and/or reduce the required length of the device for a given drag reduction. Another embodiment would include addition of small fins to the leading edge of shell 16 for a similar purpose.

Figure 3:
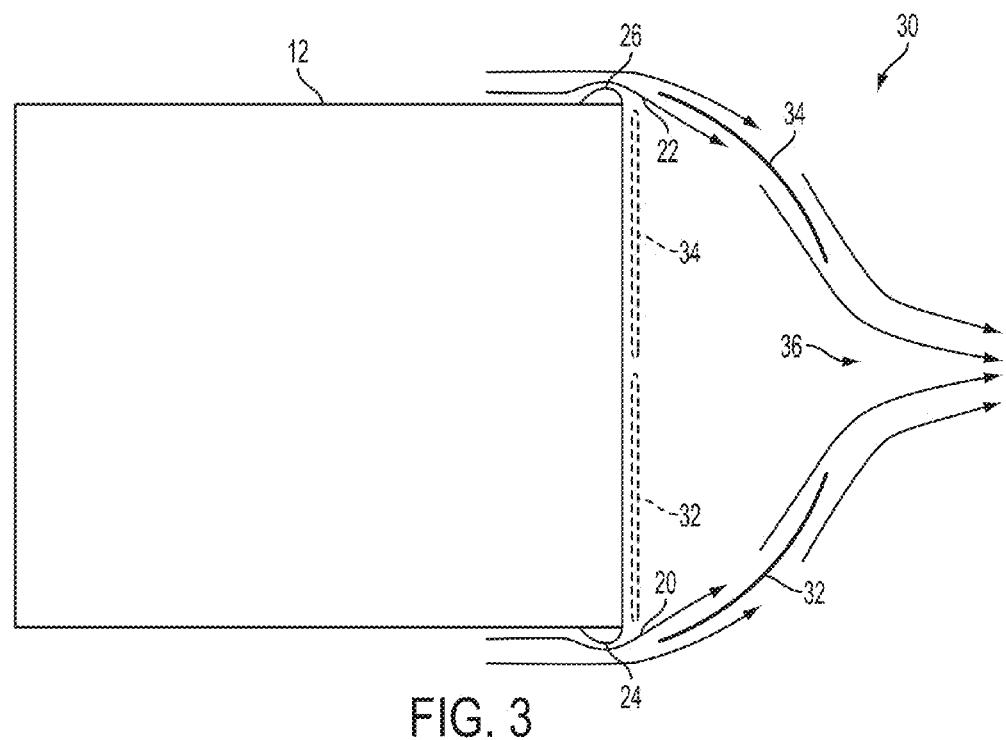
FIG. 3 is a diagrammatic representation similar to FIG. 1 showing a drag reduction assembly in accordance with an embodiment of the present invention.

FIG. 3 illustrates a drag reduction assembly 30 in accordance with an embodiment of the present invention. As can be seen, drag reduction assembly 30 includes a first side drag reduction device 32 and a second side drag reduction device 34 that may be associated, for example, with left and right rear swing doors of a semi-trailer. Devices 32 and 34 include flexible material and, when deployed, function together to provide the overall shell of the drag reduction assembly. Like other embodiments of a drag reduction assembly of the present invention, devices 32 and 34 are preferably capable of transitioning between a deployed position (shown in solid lines) and a non-deployed, i.e., stowed or folded, position (shown in broken lines). Preferably, the deployed position will occur automatically by flow of fluid.

Fluid flow modifiers 24 and 26, located on lateral sides of object 12, modify airflow along object 12 as described above. Apertures 20 and 22 provide intakes for a portion of the airflow, as also described above. For example, the intake apertures may be configured as NACA ducts to enhance the internal airflow and increase the jet effect. In this embodiment, air entering through apertures 20 and 22 may exit through a large gap 36 located between devices 32 and 34. Thus, there is no need for the respective shell portions of devices 32 and 34 to be interconnected by a permeable web (such as indicated at 18 in the previous embodiments). As will be apparent from the discussion below, such an arrangement permits the devices 32 and 34 to fold easily out of the way as the trailer doors are opened.

Again, while FIG. 3 shows the apertures 20 and 22 located behind object 12, they can be formed as part of a structure attached on the side of object 12 in order to bring the curved portion of the drag reduction assembly forward. Moving the curved portion forward has several advantages, such as reducing the overall length of the drag reduction assembly behind the object, allowing a smaller rear opening without lengthening the drag reduction assembly, and/or allowing a gentler curve of the drag reduction assembly to reduce air flow separation.

Toward this end, FIGS. 4-9 illustrate a first side drag reduction device 40 in accordance with an embodiment of the present invention as it appears when deployed (erected) by relative motion of air. As can be seen, device 40 is generally located at the rear of a semi-trailer 42 in association with a left door 44 (when viewed from behind). It will be appreciated that a mirror image drag reduction device will be associated with the right door of semi-trailer 42. The two drag reduction devices function together when deployed as a drag reduction assembly in order to reduce aerodynamic drag imposed on the trailer. In FIGS. 4, 5, 7 and 8, the right door is shown open merely for purposes of illustration.

As can be seen, device 40 generally comprises a shell 46 formed of suitable flexible material. For example, as described above, shell 46 may be formed of material similar to that utilized in the manufacture of sails. In this embodiment, the outer flow surface of shell 46 follows a curvature that is consistent from top to bottom. The leading edge of shell 46 is attached to a rigid mounting structure 48, which is itself attached to the lateral side of trailer 42 just forward of door 44. As can be seen, mounting structure 48 defines a plurality of intake apertures, here formed as a series of NACA ducts such as those indicated at 50.

Figure 6:
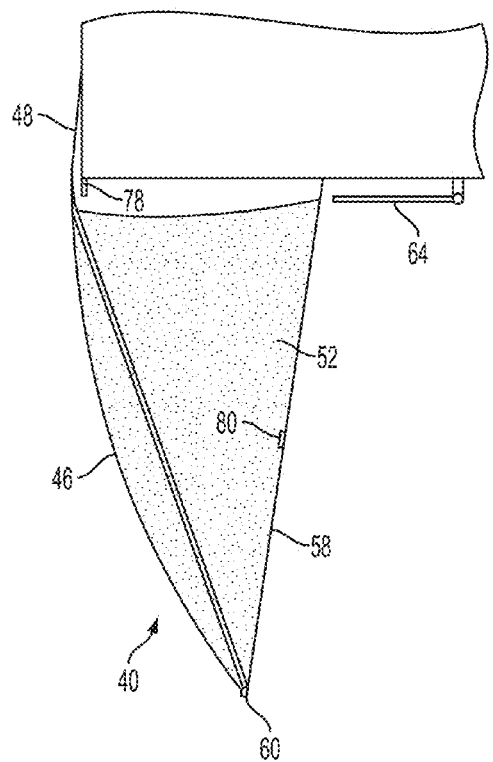
FIG. 6 is a top view of the device of FIG. 4.
Figure 7:
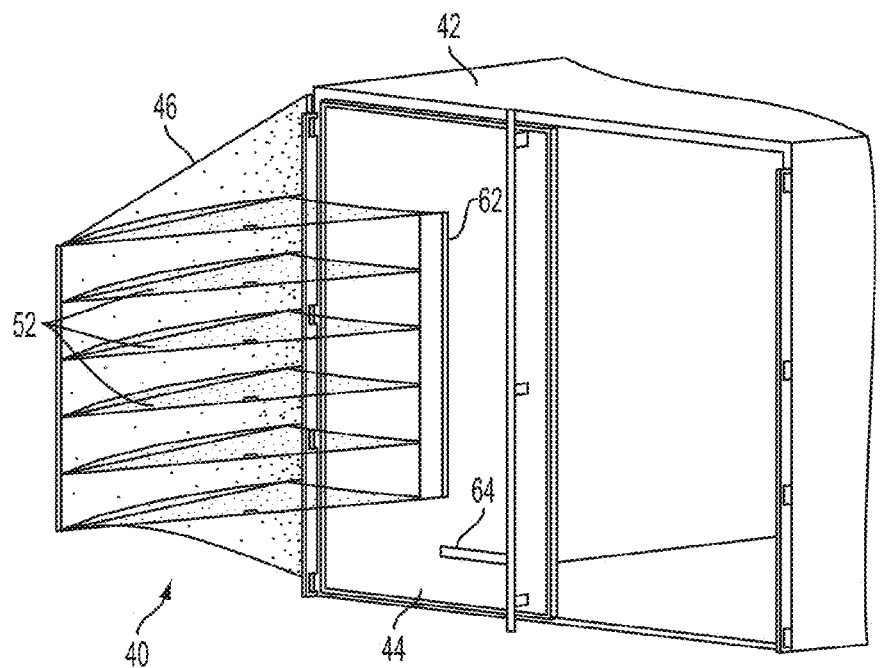
FIG. 7 is an isometric rear view of the device of FIG. 4 from a first inside viewing angle.
Figure 8:
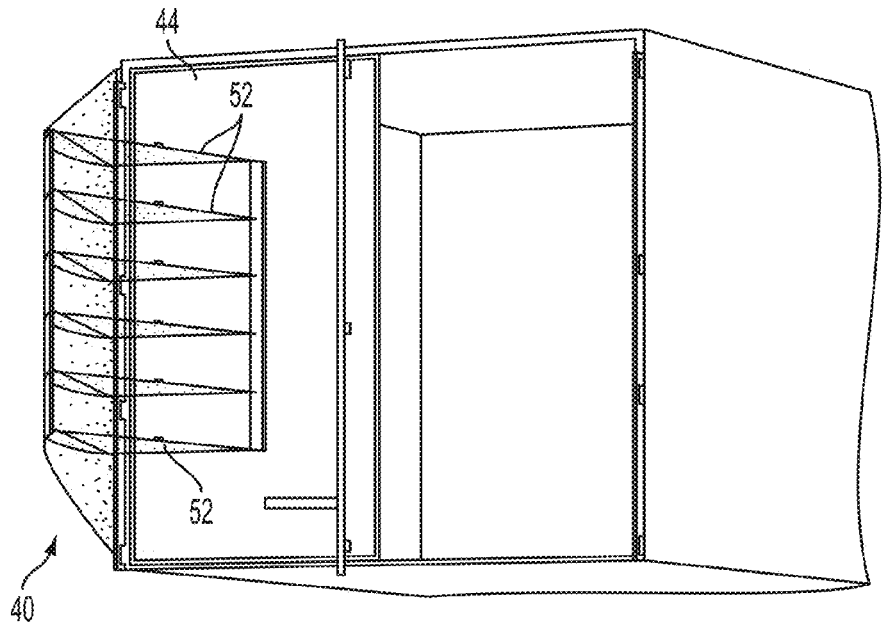
FIG. 8 is an isometric rear view of the device of FIG. 4 from a second inside viewing angle.

Referring now particularly to FIGS. 6-8, device 40 further includes a series of horizontal buttresses 52 attached to the inside surface of shell 46. While buttresses could be formed of fluid impermeable material, it will often be desirable to form buttresses 52 of a suitable fluid permeable material, such as a mesh. This will limit the extent to which buttresses 52 affect the aerodynamic characteristics of the overall arrangement.

Figure 15:
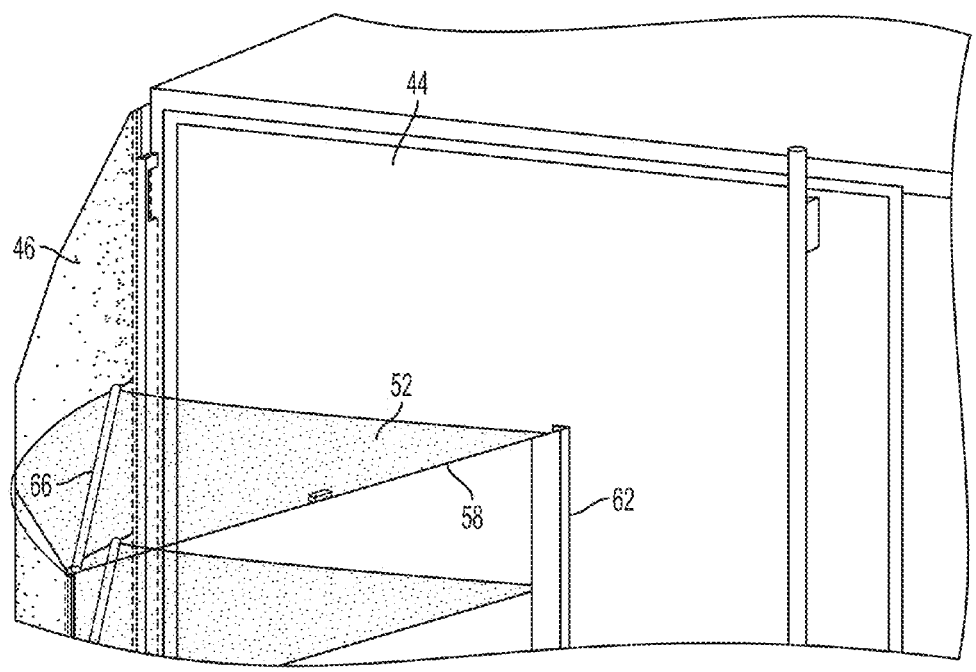
FIG. 15 is an enlarged fragmentary isometric inside rear view of an upper portion of the device of FIG. 4.
Figure 16:
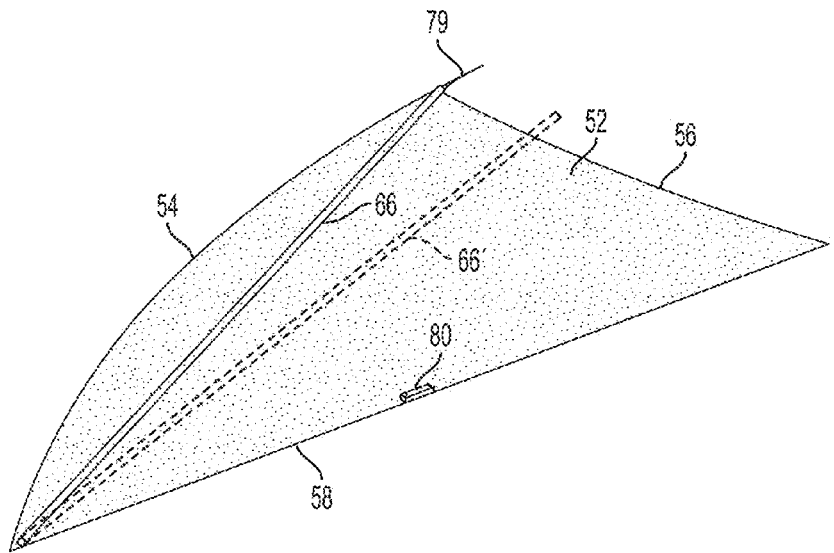
FIG. 16 is an isometric view showing one of the buttresses that may be used in the device of FIG. 4.

As shown most clearly in FIGS. 6 and 15-16, buttresses 52 in this embodiment each have a generally triangular configuration with a first arcuate edge 54 connected (such as stitching) to an inner surface of shell 46. A second edge 56 is located adjacent to door 44, whereas a third edge 58 faces the drag reduction device associated with the other trailer door. It can be seen that the vertex between edges 54 and 58 is preferably located at or near the trailing edge 60 of shell 46. In contrast, the vertex between edges 54 and 56 is preferably located rearward of the leading edge of shell 46. This will provide a flexible "hinge" rearward of the shell's leading edge to facilitate folding of drag reduction device 40 as door 44 is opened. The vertex between edges 56 and 58 is connected to a suitable mounting structure 62 attached to door 44. Advantageously, mounting structure 62 may be located laterally outside of door handle 64 so as to not interfere with operation of the handle.

Rigid or semi-rigid members may be incorporated into device 40 in order to facilitate maintaining the device in the correct position when deployed. For example, a vertical batten formed of fiberglass, polymer or another suitable semirigid material may be located at trailing edge 60 of shell 46. Such a batten may, for example, be in the form of a rod located in a tubular pocket formed in shell 46. Similarly, buttresses 52 may each include a respective horizontal batten 66, also preferably formed of suitable semirigid material. One or more tubular pockets may be provided on the flexible material of buttress 52 in order to retain battens 66 in position.

In the illustrated embodiment, it can be seen that batten 66 extends between the edge 54-edge 58 vertex and the edge 54-edge 56 vertex. Because batten 66 does not extend along arcuate edge 54, it does not maintain the curvature of shell 46 which is instead maintained by aerodynamic effects. Rather, the distal end of batten 66 will be under compression due to the interaction of outward aerodynamic forces and the attachment of the edge 56-edge 58 vertex at mounting structure 62. As a result, batten 66 assists in maintaining trailing edge 60 of shell 46 in the desired location (e.g., not swinging out) when device 40 is deployed.

In an alternative embodiment, as shown schematically in FIG. 16, a batten 66' may be utilized in addition to or instead of batten 66. As can be seen, the proximal end of batten 66' does not extend to the edge 54-edge 56 vertex, but instead extends beyond edge 56. When device 40 is deployed, this proximal end will engage door 44. Such an arrangement may be desirable to inhibit drooping of shell 46, particularly at lower speeds.

Figure 4:
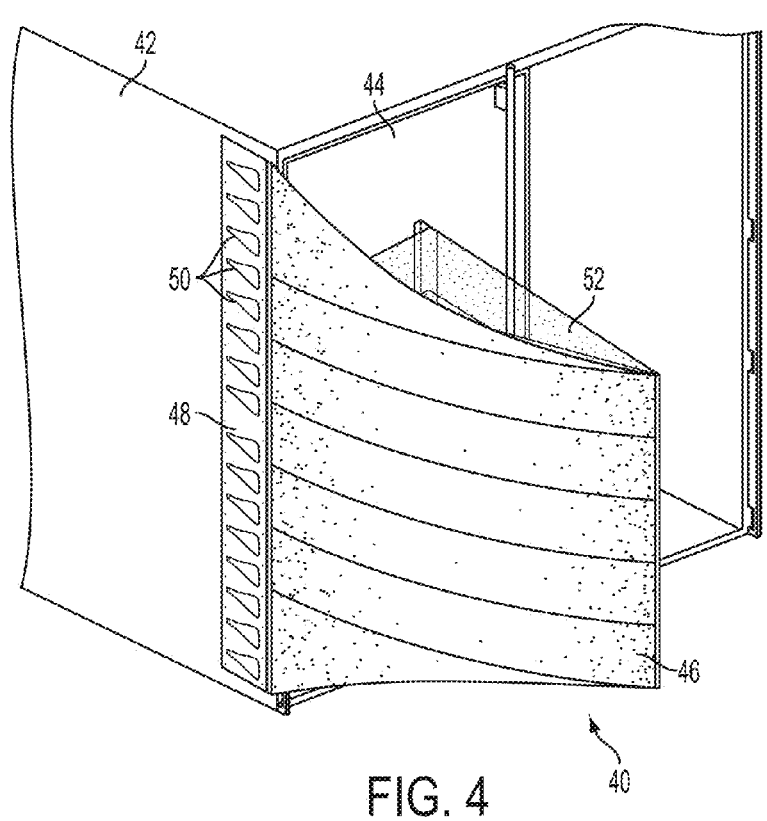
FIG. 4 is an isometric outside rear view showing one device of the overall drag reduction assembly attached to the rear of a semi-trailer.
Figure 11:
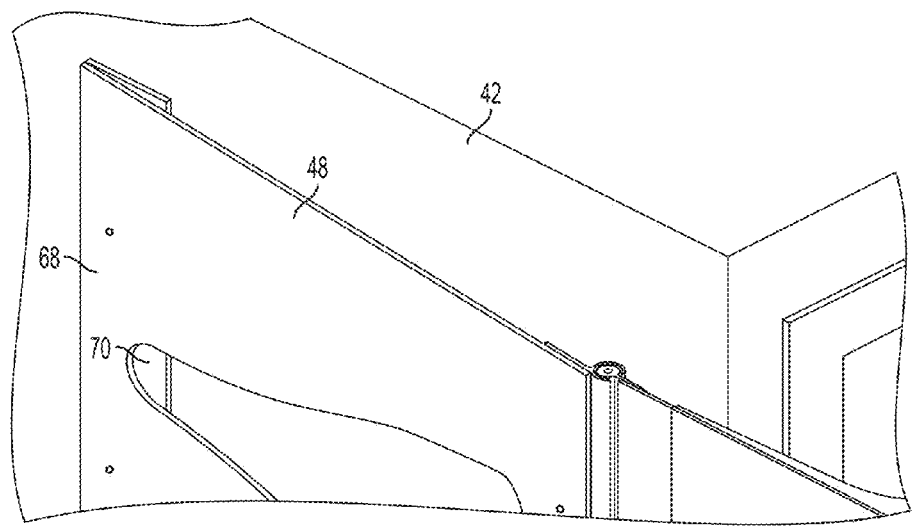
FIG. 11 is an enlarged fragmentary isometric view showing the top portion of the rigid mounting structure fixed to the side of the semi-trailer, along with a portion of the flexible shell attached thereto.
Figure 12:
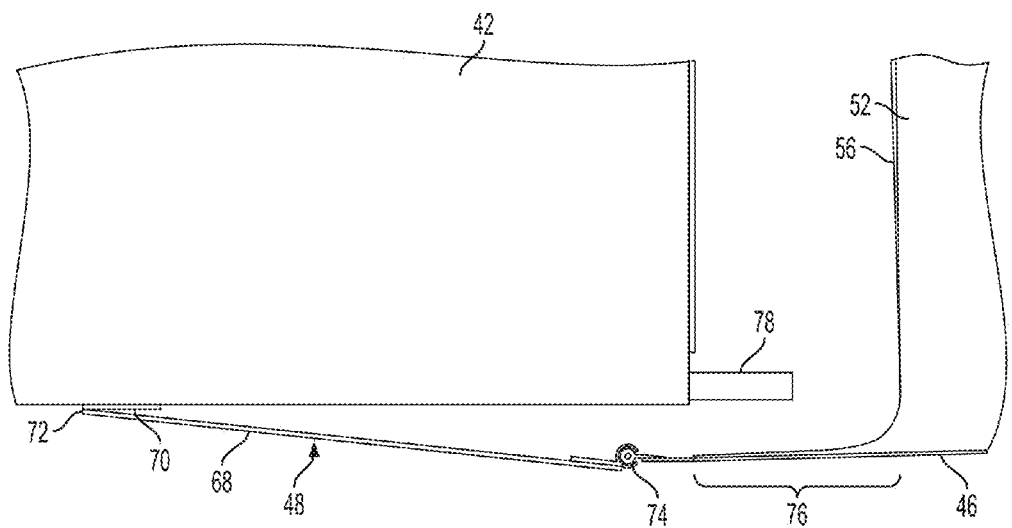
FIG. 12 is an enlarged fragmentary top view showing the top portion of the rigid mounting structure fixed to the side of the semi-trailer, along with a portion of the flexible shell attached thereto.

Referring now particularly to FIGS. 4, 11 and 12, certain additional aspects of mounting structure 48 will be described. As can been seen most clearly in FIG. 12, mounting structure 48 includes a generally planar first portion 68 pivotally connected to a generally planar second portion 70 via a suitable hinge(s), such as a "piano hinge," at pivot point 72. When device 40 is deployed, first portion 68 will pivot away from the side of trailer 42 such that air can enter through NACA ducts 50. When the trailer door is opened, however, first portion 68 will rest against the side of trailer 42 in an unobtrusive manner.

It can be seen that, in this exemplary embodiment, the leading edge of shell 46 is connected to mounting structure 48 via a mounting slot (described more fully below) located at the distal end 74 of first portion 68. Advantageously, distal end 74 of first portion 68 is located forward of the most rearward point of trailer 42. As a result, the rigid components of mounting structure 48 will not engage loading docks, ramps or the like against which the trailer may be backed for loading and unloading. Instead, the portion 76 of device 40 between the most rearward point of trailer 42 and edge 56 of buttresses 52 may be formed entirely of flexible material. In cases where the trailer has a protruding hinge 78, portion 76 may be sized, as shown, to provide appropriate clearance for the hinge. Buttresses 52 may include a flexible reinforcing portion, as indicated at 79 in FIG. 16, to enhance the strength of shell 46 in this location.

As noted above, the configuration of device 40 allows it to collapse and fold as door 44 is opened. When door 44 is swung completely open against the side of trailer 42, device 40 will be located in the small space therebetween. The folding of device 40 may be facilitated by various features, such as features that promote pleating of buttresses 52. For example, it may be desirable to provide elastic cords at various locations of device 40. In the illustrated embodiment, however, each of buttresses 52 includes a small weight 80 (FIG. 16) along edge 58 to promote pleating of the associated buttress as door 44 is opened. If desired, straps may be provided to retain the drag reduction assembly in the stowed (non-deployed) position even when the trailer doors are closed.

Figure 13:
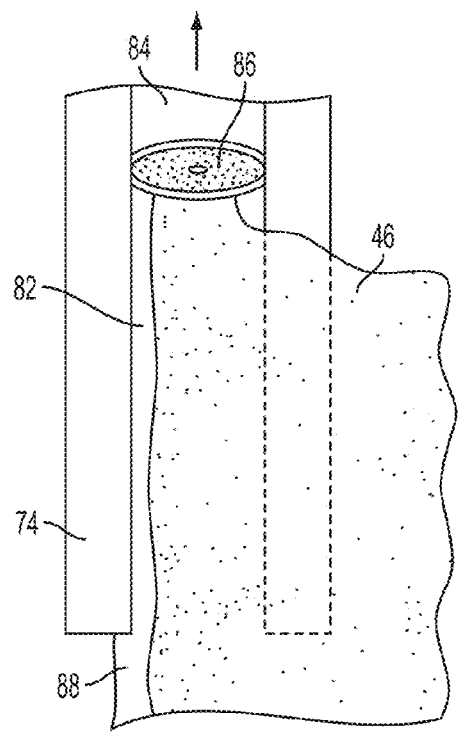
FIG. 13 is an enlarged fragmentary view of the rigid mounting structure showing the manner in which the flexible shell is connected using an elongate bead inserted into a complementary slot.
Figure 14:
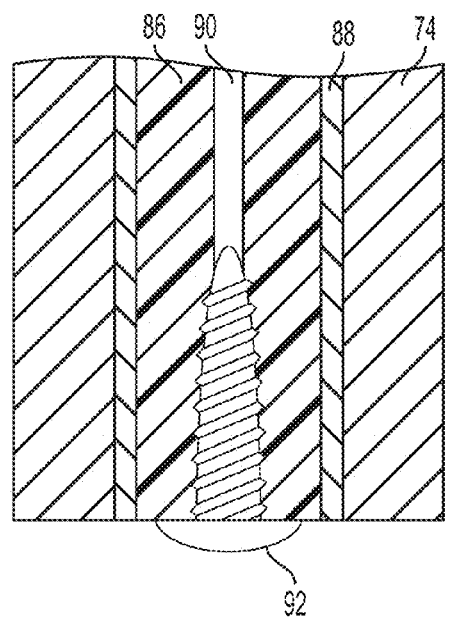
FIG. 14 is an enlarged fragmentary cross-sectional view showing one exemplary technique for maintaining the flexible shell in position with respect to the rigid mounting structure.

Although a drag reduction assembly of the present invention will generally be less susceptible to damage than devices of the prior art, it may nevertheless be necessary to repair or replace certain components from time to time. For example, shell 46 could become ripped and require replacement. Toward this end, embodiments of the present invention contemplate that the manner in which shell 46 is connected to the trailer should facilitate ease of attachment and removal. Referring now to FIGS. 13 and 14, the illustrated embodiment utilizes a bead in slot arrangement by which the leading edge of shell 46 is connected to the distal end 74 of mounting structure 48. In particular, the leading edge of shell 46 may include a bendable bead 82 which is inserted at one end of a vertical receiving slot 84 located at distal end 74 of mounting structure 48. Bead 82 may then be slid along slot 84 (as indicated by the arrow in FIG. 13) until shell 46 is in the correct position.

In this embodiment, bead 82 comprises an elastomeric or otherwise semi-rigid core 86 surrounded by an outer fabric layer 88. Core 86 may have a through bore, such as through bore 90, to enhance the bendability of bead 82. A fastener, such as screw 92, may be inserted into one or both ends of core 86 to retain shell 46 in position. In particular, the fastener will expand bead 82 radially outward into frictional engagement with the inner surface of slot 84. A vertical bead may be similarly provided at the edge 56-edge 58 vertices of buttresses 52 in for receipt in a slot defined by mounting structure 62.

Figure 5:
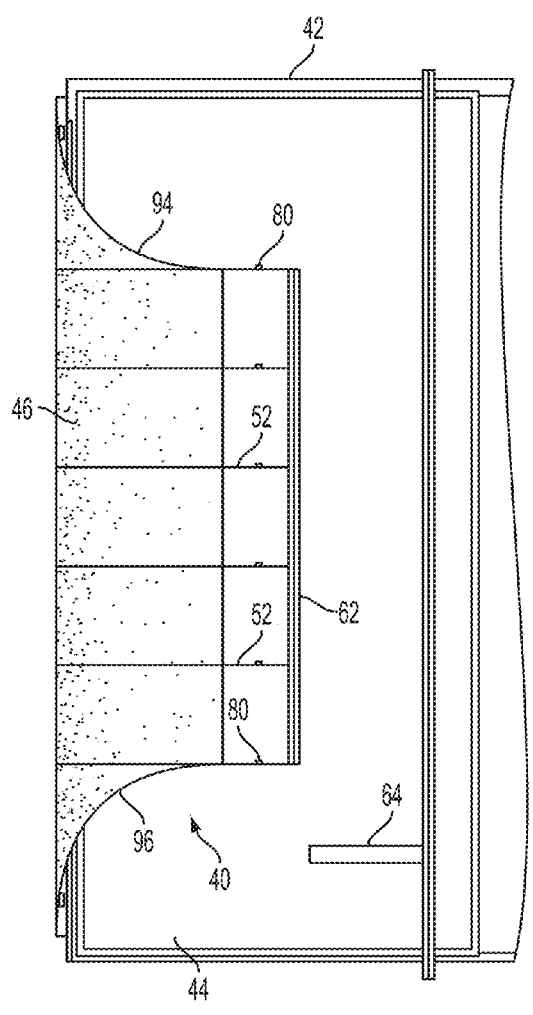
FIG. 5 is a rear elevation of the device of FIG. 4.
Figure 9:
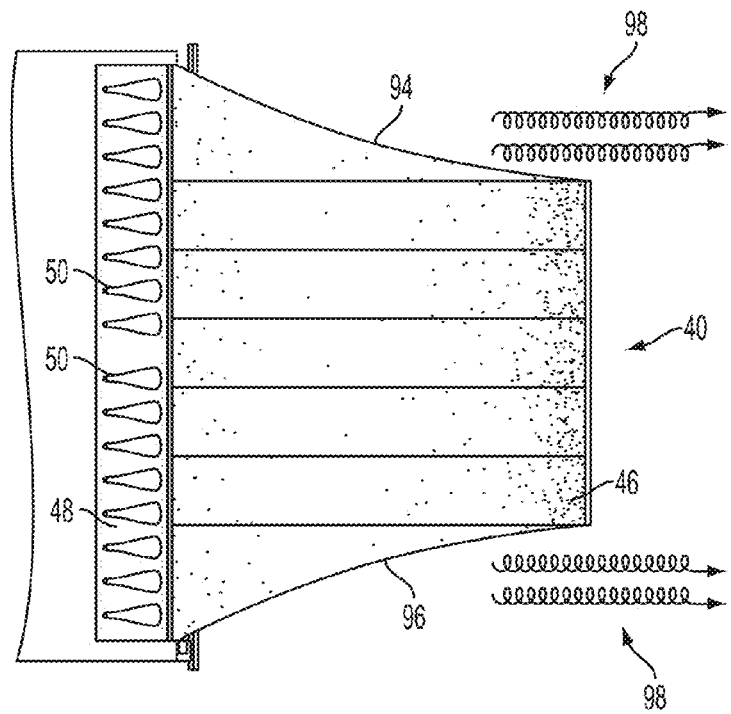
FIG. 9 is a side elevation of the device of FIG. 4.
Figure 10:
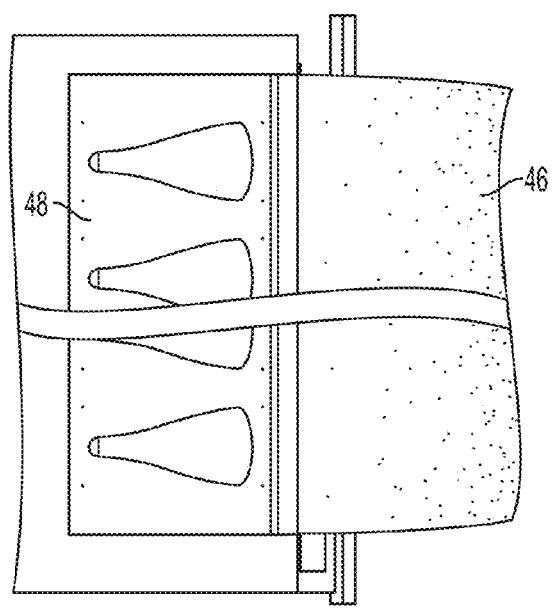
FIG. 10 is an enlarged fragmentary view showing top and bottom portions of a rigid mounting structure fixed to the side of the semi-trailer, along with a portion of the flexible shell attached thereto.

Referring now to FIGS. 5 and 9, in can be seen that shell 46 defines arcuate upper and lower edges 94 and 96 in this embodiment. As noted above, NACA ducts 50 guide airflow into and through the device 40. In addition, upper and lower edges 94 and 96 are each analogous to one side of a very large NACA duct. As a result, upper edge 94 and lower edge 96 create vortices 98 that advantageously guide airflow and reduce drag. It may be desirable to omit the uppermost two and lowermost two NACA ducts 50 in this embodiment as they will have minimal contribution to airflow inside of shell 46.

Figure 17:
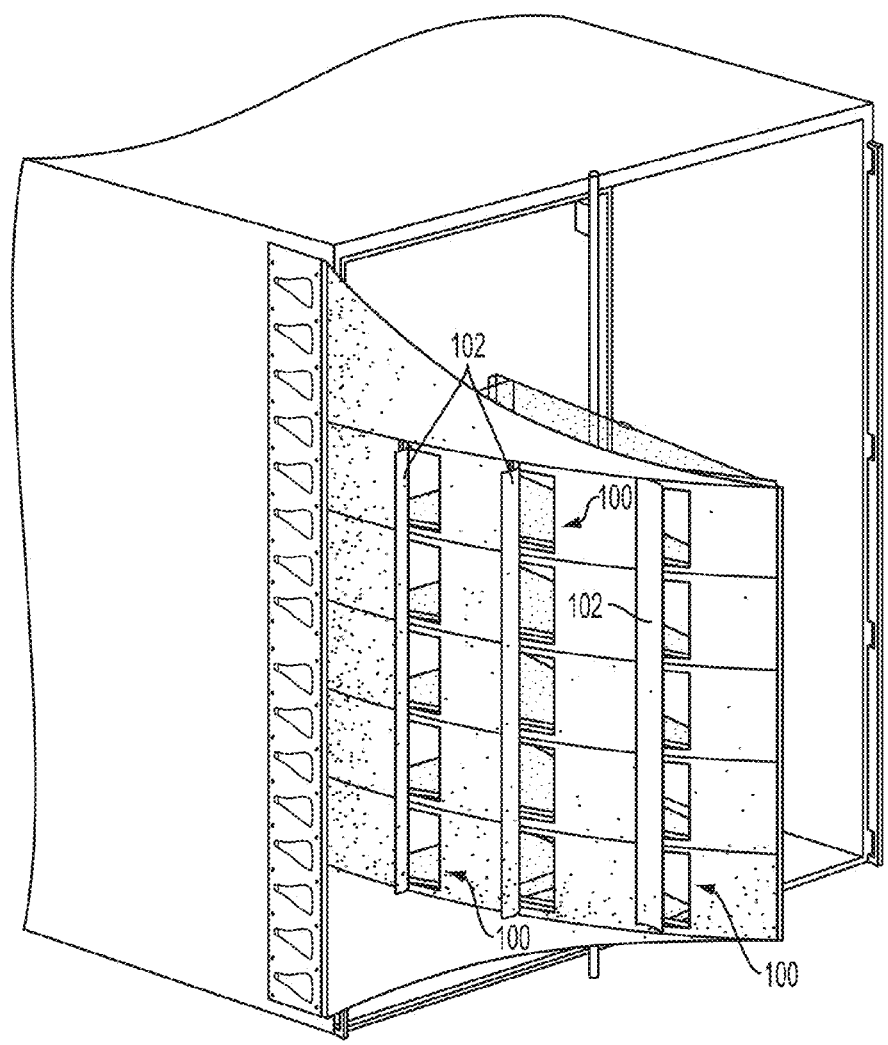
FIG. 17 is a view similar to FIG. 4 but showing an alternative embodiment having relief vents to lessen undesirable effects of strong cross breezes.

FIG. 17 illustrates an alternative embodiment in which a series of relief vents 100 are defined in shell 46. Relief vents 100 allow a strong cross-breeze to escape in order to prevent excessive deformation of (and possible damage to) shell 46. In this embodiment, vertical flaps 102 are provided to cover the relief vents 100 during normal conditions. Flaps 102 may be held normally closed by magnetic strips or the like located at the distal end of each flap.

Figure 18:
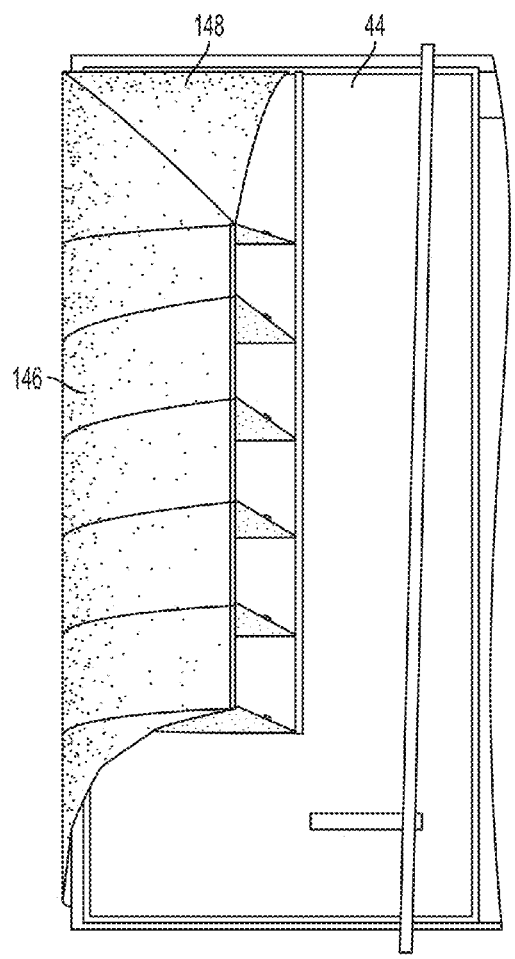
FIG. 18 is a view similar to FIG. 5 but illustrating an alternative embodiment.
Figure 19:
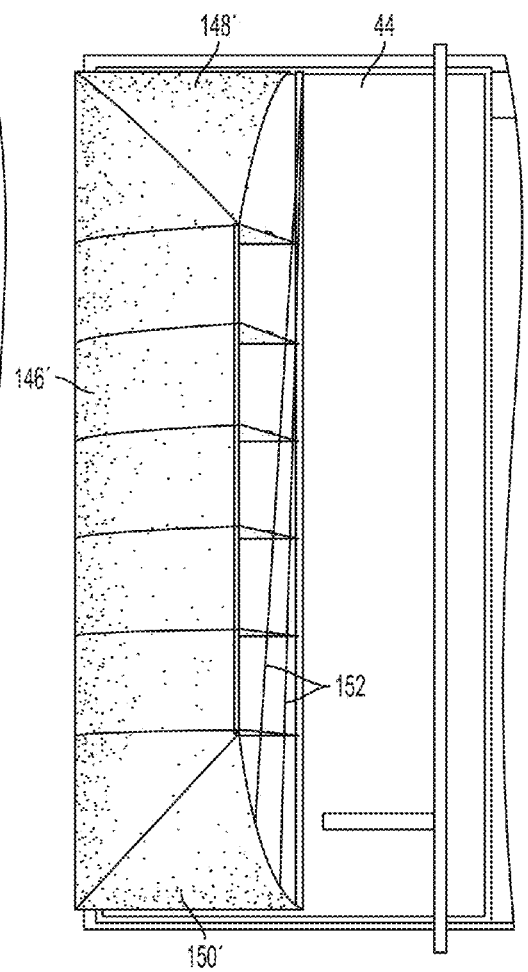
FIG. 19 is a view similar to FIG. 5 but illustrating an alternative embodiment.

FIG. 18 illustrates an alternative embodiment in which a shell 146 is equipped with a top portion 148 that extends across door 44 in the horizontal direction. Similarly, FIG. 19 shows an alternative embodiment in which a shell 146' has both such a top portion 148' and a bottom portion 150'. It will be appreciated, based on the above discussion, that such top portions and bottom portions, when taken in conjunction with the mirror image counterpart on the other side, resemble large NACA ducts, tending to direct air into and through the drag reduction assembly. As can be seen, a plurality of self-pleating cables 152 may be utilized to facilitate transition of the drag reduction device into the non-deployed position.

Other variations are also contemplated. For example, another embodiment of the drag reduction assembly could be integrated into a rollup, or a door design that provides the functionality of a rollup door. Rollup doors differ from swing doors in part through the ability to back up to a loading dock in the closed position, while permitting subsequent opening of the doors without moving the trailer. A drag reduction assembly of the present invention can close automatically when trailer speed is low, and be flexible enough to move with the door as it bends while opening and closing.

In addition, lights can be incorporated inside, outside, or within the drag reduction assembly to enhance safety or communicate messages or advertising. In one embodiment, for example, the structure of the shell can incorporate light tubes to channel light to desired locations.

Figure 20:
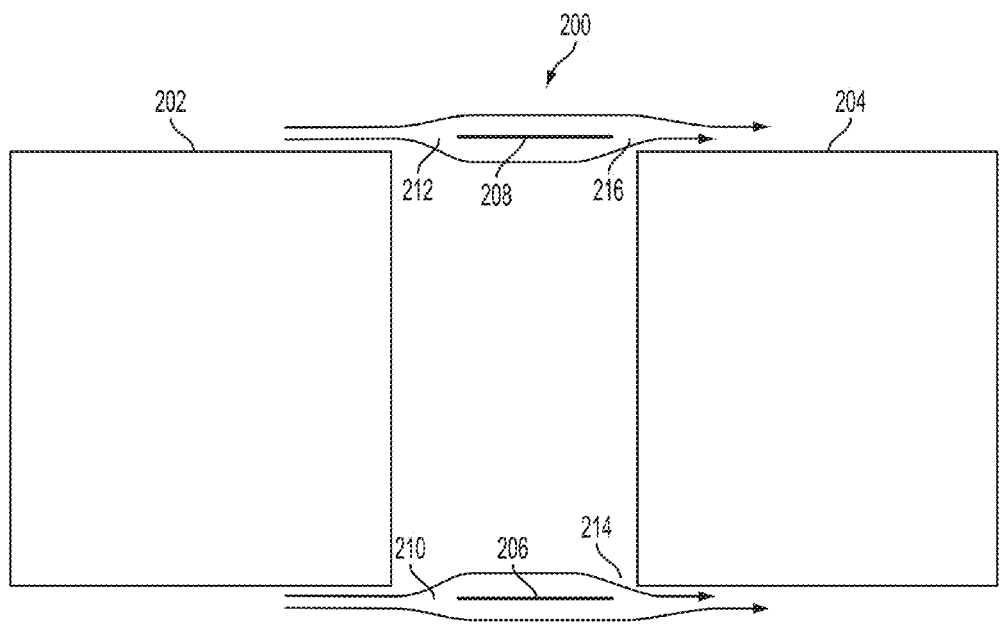
FIG. 20 is a diagrammatic representation from above showing an alternative arrangement in accordance with the present invention that may be utilized, for example, between the tractor and the trailer or between two trailers of a double trailer combination.

As one skilled in the art will recognize, principles of the present invention are not limited to use at the end of a semi-trailer. For example, FIG. 20 shows a drag reduction assembly 200 utilized between first and second trailers 202 and 204 of a double trailer combination. Drag reduction assembly 200 utilizes a pair of drag reduction devices 206 and 208 located on respective sides of the trailers. Leading apertures, such as gaps 210 and 212, allow a portion of the flowing air to divert inside of devices 206 and 208. Trailing apertures 214 and 216 allow the inside air to rejoin the air flowing along the outside. A similar arrangement could be employed between the cab and the front end of the trailer box.

Figure 21:
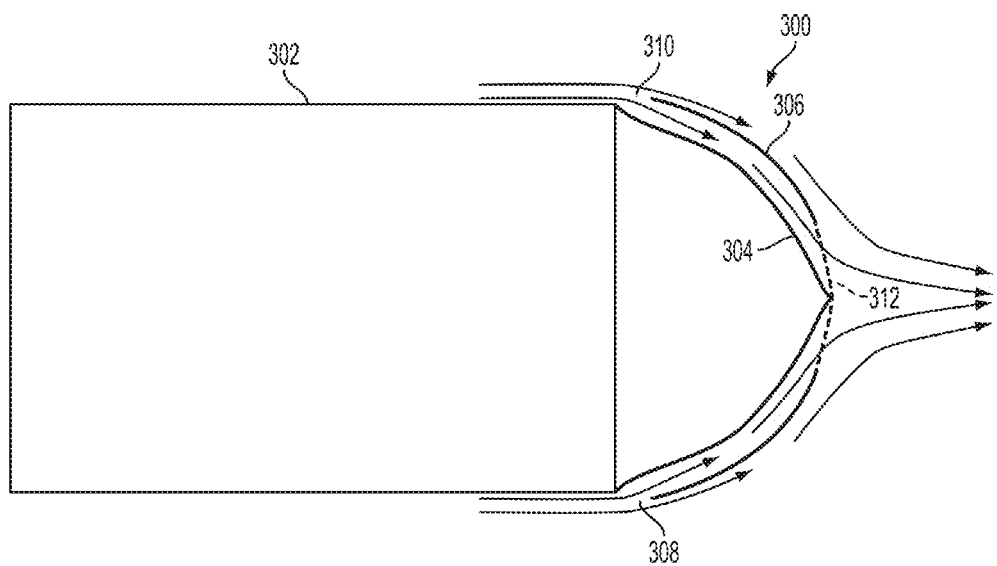
FIG. 21 is a diagrammatic representation viewed from above showing a drag reduction assembly attached to the rear of a semi-trailer (or other object having relative motion to a surrounding fluid) in accordance with an embodiment of the present invention.

FIG. 21 illustrates a further embodiment in which a drag reduction assembly 300 is located behind an object 302 experiencing relative motion to the surrounding fluid (from left to right). As can be seen, drag reduction assembly 300 in this embodiment has an inner wall 304 and outer wall 306. The inner wall 304 may be attached directly to the object 302, while the outer wall 306 is attached in such a way as to allow one or more apertures, such as those indicated at 308 and 310. The aperture(s) allow the fluid to flow between the walls 304 and 306 as well as the usual path over the outer surface. The fluid that enters the aperture(s) will flow between the walls and then exit the device through a permeable portion 312. This embodiment maintains shape, in part, through ram effects of the fluid flow between the walls.

Figure 22:
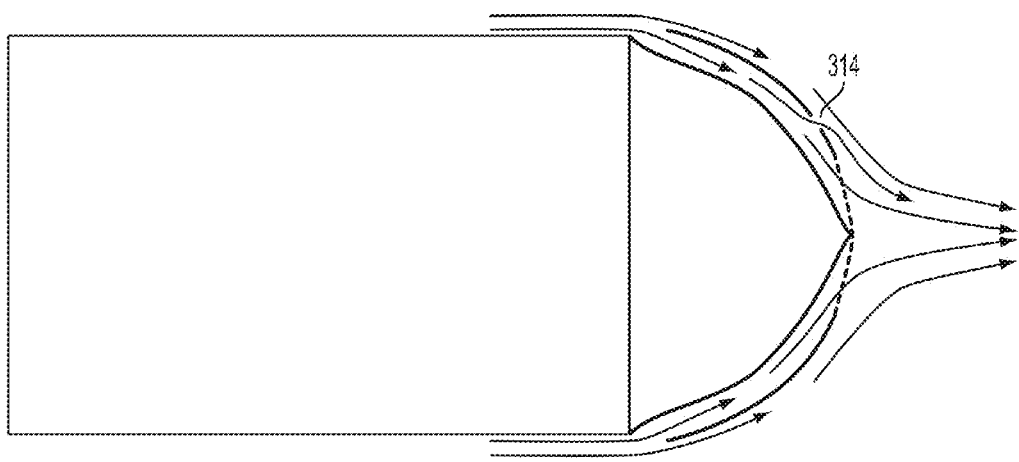
FIG. 22 is a diagrammatic representation viewed from above showing a drag reduction assembly attached to the rear of a semi-trailer (or other object having relative motion to a surrounding fluid) in accordance with an embodiment of the present invention.

In circumstances where the velocity of the fluid is too high, or the curvature of the device is too sharp, it is possible that boundary separation of flow could occur before the fluid reaches the exit area at permeable portion 312. Thus, as shown in FIG. 22, embodiments are contemplated in which the external wall has one or more exit apertures 314 part way along the flow path of the fluid to allow some fluid between the walls to exit. Used appropriately, this will delay boundary separation and allow non-turbulent flow in the wake even with relatively short devices.

Figure 23:
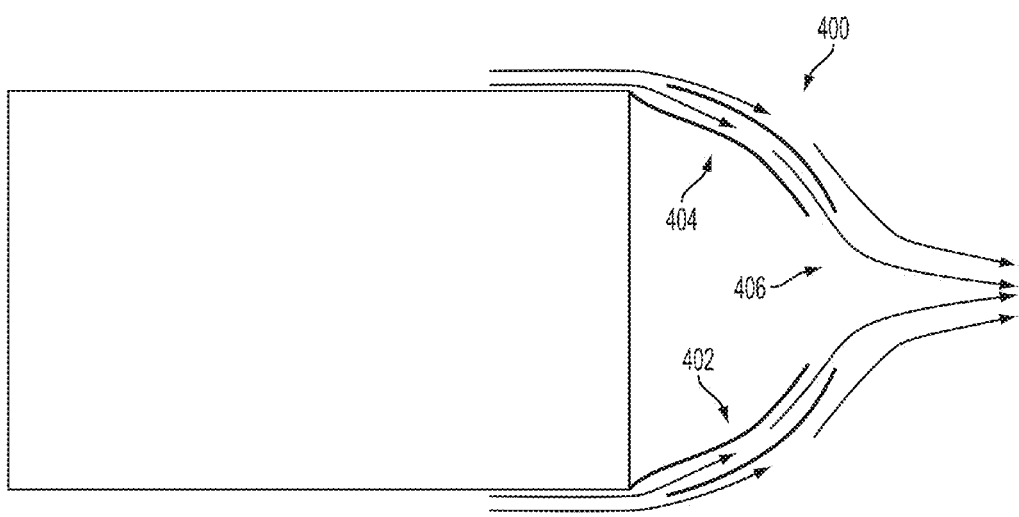
FIG. 23 is a diagrammatic representation viewed from above showing a drag reduction assembly attached to the rear of a semi-trailer (or other object having relative motion to a surrounding fluid) in accordance with an embodiment of the present invention.

FIG. 23 illustrates an alternative embodiment in which a drag reduction assembly 400 of the present invention includes a first side drag reduction device 402 and a second side drag reduction device 404. Each of the devices 402 and 404 includes an inner and an outer wall through which a portion of the fluid will flow, as described above in conjunction with FIGS. 21 and 22. The larger opening 406 through which the internal air exits forms a truncated cone such that the overall length of the assembly is shorter than some other embodiments. The shorter length can have positive effects on manufacturability, operations, and regulatory issues.

Figure 24:
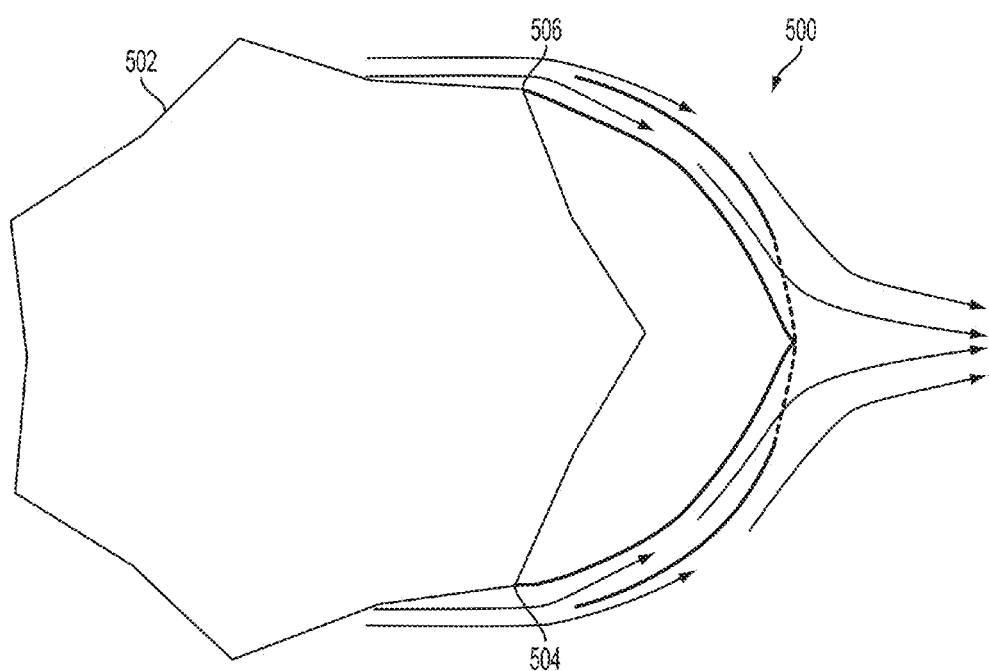
FIG. 24 is a diagrammatic representation viewed from above showing a drag reduction assembly attached to an irregular shaped object in accordance with an embodiment of the present invention.

FIG. 24 shows a drag reduction assembly 500 similar to drag reduction assembly 300. In this case, however, drag reduction assembly 500 is being used in conjunction with a nonrectangular object 502. It will be appreciated that assembly 500 allows smoothing of the fluid flow and reduction/elimination of turbulence in the wake independent of the overall shape as long as assembly 500 is attached to the object at the locations 504, 506 where boundary separation would otherwise occur.

It can thus be seen that the present invention provides a novel drag reduction assembly for use with a object experiencing relative motion with respect to surrounding fluid. While preferred embodiments of the invention have been shown and described, modifications and variations may be made thereto by those of ordinary skill in the art without departing from the spirit and scope of the present invention. Furthermore, it should be understood that aspects of the various embodiments may be interchanged and combined in whole or in part to yield still further embodiments. Furthermore, those of ordinary skill in the art will appreciate that the foregoing description is by way of example only, and is not intended to be limitative of the invention as further described in the appended claims.

What is claimed is:

1. A drag reduction assembly mountable on a vehicle, said assembly comprising:
   at least one shell of flexible web material, said at least one shell being connectable to the vehicle to be movable between non-deployed and deployed positions;
   said at least one shell being configured to provide an inner flow surface and an outer flow surface in the deployed position along which air flows as the vehicle experiences relative motion with respect thereto;
   said drag reduction assembly further defining at least one intake aperture through which a portion of the moving air will enter and flow along said inner flow surface, another portion of the moving air flowing in parallel thereto along said outer flow surface; and
   said drag reduction assembly further defining an air exit location at which the portion of the moving air flowing along the inner flow surface of said at least one shell will flow out at said exit location so as to exit said at least one shell such that the air flowing along the inner flow surface and the air flowing along the outer flow surface facilitates maintaining said at least one shell in the deployed position,
   wherein said at least one shell comprises a plurality of battens that are rigid or semirigid.

2. A drag reduction assembly as set forth in claim 1, further comprising rigid first and second mounting structures attachable to side surfaces of the vehicle, said at least one shell being connected to the vehicle via said first and second mounting structures.

3. A drag reduction assembly as set forth in claim 2, wherein each of said first and second mounting structures defines a plurality of said intake apertures.

4. A drag reduction assembly as set forth in claim 3, wherein said intake apertures are configured as NACA ducts.

5. A drag reduction assembly as set forth in claim 2, wherein said at least one shell comprises an integral shell connected to both of said first and second mounting structures.

6. A drag reduction assembly as set forth in claim 5, wherein said integral shell comprises fluid impermeable material and fluid permeable material in different areas thereof.

7. A drag reduction assembly as set forth in claim 6, wherein said exit location of said at least one shell comprises said fluid permeable material.

8. A drag reduction assembly as set forth in claim 2, wherein said at least one shell comprises first and second shells associated with respective sides of the vehicle.

9. A drag reduction assembly as set forth in claim 1, wherein said at least one shell comprises an outside layer and an inside layer, said outer flow surface being an outside surface of said outside layer and said inner flow surface being an inside surface of said outside layer.

10. A drag reduction assembly as set forth in claim 1, wherein said at least one shell comprises an inward curvature in the deployed position.

11. A drag reduction assembly mountable on a vehicle, said assembly comprising:
    at least one shell of flexible web material, said at least one shell being connectable to the vehicle to be movable between non-deployed and deployed positions;
    said at least one shell being configured to provide an inner flow surface and an outer flow surface in the deployed position along which air flows as the vehicle experiences relative motion with respect thereto;

said drag reduction assembly further defining at least one intake aperture through which a portion of the moving air will enter and flow along said inner flow surface, other air flowing along said outer flow surface; and said drag reduction assembly further defining an air exit location at which the portion of the moving air which entered said at least one shell will exit said at least one shell;

wherein said at least one shell comprises at least one cross-breeze relief vent.

12. A drag reduction assembly for an object experiencing relative motion in a fluid environment, said assembly comprising:

first and second shells of flexible web material associated with respective sides of the object, said first and second shells each being movable between a non-deployed position and a deployed position;

in said deployed position, said shells each defining a curved outer flow surface along which fluid will flow so as to reduce drag experienced by said object; and said shells being connectable to said object such that flow of said fluid at least in part along said outer flow surface will cause said shells to deploy through fluid dynamic effects.

13. A drag reduction assembly as set forth in claim 12, further comprising rigid first and second mounting structures attachable to said object at which a respective leading edge of said first and second shells is connected.

14. A drag reduction assembly as set forth in claim 13, wherein said shells each comprise a plurality of support members that facilitate maintaining shape of said shell in said deployed position.

15. A drag reduction assembly as set forth in claim 14, wherein said shells each comprise an unsupported web portion immediately distal of said leading edge that facilitates opening of said shell into said deployed position.

16. A drag reduction assembly as set forth in claim 14, wherein said plurality of support members include elongate battens carried by said shell, said battens extending longitudinally between a first proximal location closer to but separated from said leading edge of said shell to a second distal location farther from said leading edge of said shell.

17. A drag reduction assembly as set forth in claim 16, wherein at least some of said battens are carried by respective horizontal buttresses.

18. A drag reduction assembly as set forth in claim 13, further defining at least one intake aperture through which a portion of the fluid will enter and flow along an inner flow surface of said first and second shells.

19. A drag reduction assembly as set forth in claim 18, wherein each of said first and second mounting structure defines a plurality of said intake apertures.

20. A drag reduction assembly as set forth in claim 19, wherein said intake apertures are configured as NACA ducts.

21. A drag reduction assembly as set forth in claim 18, wherein said shells each comprise an outside layer and an inside layer, said outer flow surface being an outside surface of said outside layer and said inner flow surface being an inside surface of said outside layer.

* * * * *